(12) United States Patent
Hartmann (10) Patent No.: US 11,255,393 B2
(45) Date of Patent: Feb. 22, 2022

(54) BRAKE SHOE, SYSTEM FOR MODULAR ASSEMBLY OF A BRAKE SHOE, BRAKE APPARATUS AND METHOD FOR PRODUCING A BRAKE SHOE

(71) Applicant: SAF-HOLLAND GmbH, Bessenbach (DE)

(72) Inventor: Mark Hartmann, Sulzbach am Main (DE)

(73) Assignee: SAF-Holland GmbH, Bessenbach (DE)

( * ) Notice: Subject to any disclaimer, the term of this patent is extended or adjusted under 35 U.S.C. 154(b) by 110 days.

(21) Appl. No.: 16/481,347

(22) PCT Filed: Jan. 25, 2018

(86) PCT No.: PCT/EP2018/051834
§ 371 (c)(1),
(2) Date: Jul. 26, 2019

(87) PCT Pub. No.: WO2018/138203
PCT Pub. Date: Aug. 2, 2018

(65) Prior Publication Data
US 2019/0390725 A1 Dec. 26, 2019

(30) Foreign Application Priority Data

Jan. 26, 2017 (DE) ...................... 10 2017 101 525.6

(51) Int. Cl.
*F16D 65/092* (2006.01)
*F16D 65/02* (2006.01)
*F16D 69/00* (2006.01)

(52) U.S. Cl.
CPC ...... *F16D 65/092* (2013.01); *F16D 2065/026* (2013.01); *F16D 2069/002* (2013.01); *F16D 2069/004* (2013.01)

(58) Field of Classification Search
CPC .. F16D 65/092; F16D 2065/026; F16D 65/04; F16D 69/00; F16D 69/02;
(Continued)

(56) References Cited

U.S. PATENT DOCUMENTS 2,451,326 A * 10/1948 Eksergian ............... F16D 65/02
188/234
3,013,637 A 12/1961 Sampson
(Continued)

FOREIGN PATENT DOCUMENTS

CN 103697091 A 4/2014
CN 104813061 A 7/2015
(Continued)

OTHER PUBLICATIONS

European Patent Office, International Search Report, dated Apr. 23, 2018.

*Primary Examiner* — Pamela Rodriguez
(74) *Attorney, Agent, or Firm* — Price Heneveld LLP (57) ABSTRACT

A brake shoe having brake linings for a brake apparatus includes a carrier element, and a first brake lining segment configured to be mounted on the carrier element, and a second brake lining segment configured to be mounted on the carrier element, the first brake lining segment and the second brake lining segment being spaced apart from one another in a mounted state, and the first brake lining segment and the second brake lining segment differing from one another with regard to material composition, force loading and/or shape to configure a friction profile.

19 Claims, 4 Drawing Sheets

(58) Field of Classification Search
CPC ......... F16D 2069/002; F16D 2069/005; F16D 2069/004
See application file for complete search history.

(56) References Cited

U.S. PATENT DOCUMENTS

| | | | | |
|---|---|---|---|---|
| 6,213,260 | B1* | 4/2001 | Sirany | B24B 7/17 |
| | | | | 188/250 B |
| 9,689,448 | B2* | 6/2017 | Esgandari | F16D 69/00 |
| 2002/0170788 | A1 | 11/2002 | Cornolti et al. | |
| 2017/0074340 | A1* | 3/2017 | Orgler | F16D 65/092 |
| 2020/0124122 | A1* | 4/2020 | Fujimoto | F16D 65/0971 |

FOREIGN PATENT DOCUMENTS

| | | |
|---|---|---|
| DE | 1082141 | 2/1959 |
| DE | 1205853 | 11/1965 |
| DE | 4140220 A1 | 6/1993 |
| DE | 4337854 A1 | 5/1994 |
| DE | 29821113 | 11/1998 |
| DE | 10054151 A1 | 5/2002 |
| DE | 10346030 A1 | 5/2004 |
| DE | 10 2013 201 111 A1 | 7/2014 |
| EP | 3 396 193 A1 | 10/2018 |
| FR | 2084328 A5 | 12/1971 |
| GB | 1089955 | 11/1967 |
| GB | 1305161 | 1/1973 |
| JP | H0674261 A | 3/1994 |

* cited by examiner

BRAKE SHOE, SYSTEM FOR MODULAR ASSEMBLY OF A BRAKE SHOE, BRAKE APPARATUS AND METHOD FOR PRODUCING A BRAKE SHOE

BACKGROUND OF THE INVENTION

The present invention relates to a brake shoe, a system for the modular assembly of a brake shoe, a brake apparatus and a method for producing a brake shoe.

Brake apparatuses, such as drum brakes or disk brakes, are well known from the prior art. Here, in the braking state, a brake lining which is attached to a brake lining carrier is pressed against an abutment, for example a brake drum or a disk, whereupon a frictional resistance between the brake lining and the abutment counteracts a rotation of the abutment. As a result of said counteracting, a wheel which is connected fixedly to the abutment so as to rotate with it, in particular a commercial vehicle wheel, can be braked. In order to set certain properties in the braking behavior, the prior art knows, furthermore, brake linings, the properties of which are controlled in a targeted manner by way of the lining material, by a defined lining mixture being used, in order to boost desired properties. Here, the lining material is usually applied to a brake lining carrier, for example in the form of a cast back plate, or onto a steel back plate, the brake lining and the brake lining carrier together forming a brake shoe. However, the setting of the properties of the manufactured brake lining is restricted, since compromises from the mixed lining materials are often necessary.

It is an object of the present invention to provide a brake shoe having brake linings, which brake shoe is improved in comparison with those known from the prior art, and is optimized, in particular, with regard to the adaptation of a friction profile to different load cases.

SUMMARY OF THE INVENTION

According to the invention, a brake shoe having brake linings for a brake apparatus, in particular a drum brake or disk brake, is provided, comprising a carrier element, and a first brake lining segment which can be mounted on the carrier element and a second brake lining segment which can be mounted on the carrier element, the first brake lining segment and the second brake lining segment being of different configuration, in particular differing from one another with regard to the material composition, force loading and/or shape in order to configure a friction profile, in particular a friction profile which is dependent on the load situation. In comparison with the prior art, different types of behavior in relation to performance and wear of the first brake lining segment and the second brake lining segment can be produced or brought about by way of the adaptation according to the invention of the first brake lining segment and the second brake lining segment. In particular, the first brake lining segment and the second brake lining segment are configured in such a way that the friction profile of the first brake lining segment and the second brake lining segment is set during operation of the brake apparatus, for example in a passive manner by way of different friction speeds which act on the first brake lining segment and the second brake lining segment, or in an active manner by way of different forces which act on the first brake lining segment and the second brake lining segment. It is also conceivable that the first brake lining segment and the second brake lining segment differ with regard to their quality and/or their performance capability. In particular, a person skilled in the art understands a friction profile to be a spatial variation of a frictional resistance which is configured between the abutment and the brake shoe and preferably extends over a brake lining side of the brake shoe. It is conceivable here that the coefficients of friction change on the brake lining side of the brake shoe along a friction direction and/or perpendicularly with respect to the friction direction, the friction direction being fixed by way of the movement of the brake lining relative to the abutment. It is provided, in particular, that the friction profile changes over time. It is particularly preferably provided that the friction profile changes in a manner which is dependent on a load situation. In other words, the friction profile in the case of an intensive brake operation, in particular above a critical brake intensity, differs from the friction profile in the case of a less intensive brake operation, in particular below the critical brake intensity. In particular, a configuration of the friction profile in a manner which is dependent on the load situation is to be understood to mean that the ratio between a coefficient of friction which is assigned to the first brake lining segment and a coefficient of friction which is assigned to the second brake lining segment changes in a manner which is dependent on the load situation or operating situation, preferably changes from a value below 1 to a value above 1. For example, said ratio changes by a factor of between 2 and 10, particularly preferably of between 1.5 and 7.5, and particularly preferably by a factor of between 1 and 2.5. As a result, wear of the second brake lining segment can be restricted in an advantageous way to certain situations. At the same time, said selection can ensure, during the transition between situations which differ with regard to the contributions of the individual brake lining segments, that the brake force does not rise suddenly when the critical brake intensity is exceeded. It is conceivable here that the first brake lining segment and the second brake lining segment are in contact with one another, for example bear against one another.

It is provided in accordance with one particularly preferred embodiment that the first brake lining segment and the second brake lining segment are spaced apart from one another in a mounted state. As a result of the spacing between the first brake lining segment and the second brake lining segment, the first brake lining segment and the second brake lining segment can be actuated or designed individually in an advantageous way. In addition, an exchange of the first brake lining segment and/or the second brake lining segment is simplified. Moreover, the first brake lining segment and the second brake lining segment can be provided as a modular kit for adapting the friction profile in different material compositions and overall designs, and can be simply mounted or exchanged on the carrier element. As a result, the manufacturing costs can be reduced in an advantageous way by way of a targeted adaptation and selection of the first brake lining segment and the second brake lining segment, without a significant brake force loss needing to be feared.

It is preferably provided that a contribution of the first brake lining segment and a contribution of the second brake lining segment to the friction profile are dependent on the load. As a result, it can be set in a targeted manner that, for example, the first brake lining segment acts to a pronounced extent in the case of high loads, whereas the second brake lining segment acts in the case of lower loads. As a result, the entire brake shoe can advantageously be adapted further to the forecast loads.

It is provided, in particular, that the first brake lining segment and the second brake lining segment can be exchanged reversibly and independently of one another, that is to say the first brake lining segment and the second brake lining segment can be removed, preferably in each case individually, via a corresponding coupling mechanism after their initial mounting, and can be exchanged for other brake lining segments. As a result, for example, those brake lining segments can advantageously be exchanged which wear more rapidly, without it being necessary for all brake lining segments to be exchanged. Moreover, the brake lining segments can be adapted, for example, to different weather conditions or the adjustment of the brake behavior.

A coupling mechanism is provided for realizing the reversible exchangeability, brake lining segment-side coupling elements interacting releasably with carrier element-side coupling element, for example in a positively locking and/or non-positive manner. It is also conceivable here that the first brake lining segment and/or the second brake lining segment can be connected releasably to the carrier element via a rapid clamping mechanism or a bayonet closure. As a result, the first and the second brake lining segment can be mounted and dismantled comparatively rapidly with just a few steps. A clip mechanism is also conceivable as coupling mechanism.

Furthermore, it is conceivable that the carrier element is configured in such a way that it can be released from the brake apparatus. The carrier element can thus be released from the brake apparatus and the individual brake lining segments can be exchanged comfortably.

It is provided in a further embodiment of the present invention that a third brake lining segment is arranged as reserve or replacement brake lining segment on the carrier element. The third brake lining segment is arranged, in particular, in such a way that it does not make any contribution to the friction profile during operation. To this end, for example, the third brake lining segment, in the carrier element, is arranged set back with respect to the first brake lining segment and the second brake lining segment, in particular set back in such a way that the third brake lining segment is spaced apart from a brake disk or a brake drum during braking. In this way, an unused replacement brake lining segment can advantageously be carried along, which replacement brake lining segment can replace the first or second brake lining segment as required.

It is provided in accordance with a further embodiment of the present invention that the brake shoe is configured in such a way that, in an installed state of the brake shoe, in which state the brake apparatus is installed with the brake shoe on a wheel with a wheel axle, the first brake lining segment is spaced apart from the second brake lining segment in a radial direction and/or circulating direction in relation to the wheel axle. As a result, the first brake lining segment and the second brake lining segment can be arranged above one another and/or behind one another and/or next to one another as viewed in the friction direction, in a manner which is dependent on the desired friction profile. It is also conceivable that the first brake lining segment and the second brake lining segment are arranged on the carrier element in a pattern, for example in rows and/or columns.

It is expediently provided that the first brake lining segment and the second brake lining segment are arranged above one another and/or behind one another and/or next to one another in the radial direction. In the case of a disk brake, for example, this results in different friction speeds for the first brake lining segment and the second brake lining segment, which different friction speeds in turn influence the respective level of the coefficient of friction and a temperature behavior of the first brake lining segment and the second brake lining segment. The first brake lining segment is preferably arranged on a side which faces away from the wheel axle and is designed for higher friction speeds in comparison with the second brake lining segment, whereas the second brake lining segment which faces the wheel axle is more temperature-resistant in comparison with the first brake lining segment.

It is preferably provided that a spacing which is measured in one direction between the first brake lining segment and the second brake lining segment assumes a value of between 0.1 and 0.4 times, preferably between 0.08 and 0.25 times and particularly preferably between 0.05 and 0.13 times an extent of the first brake lining segment and the second brake lining segment, that is to say the sum of the first brake lining segment and the second brake lining segment, which extent is measured in the same direction. A sufficient spacing advantageously prevents the first and the second brake lining segment from coming into contact permanently, as a result of which the configuration of the friction profile is restricted and an exchange of the first brake lining segment or second brake lining segment is made more difficult.

It is provided in a further embodiment of the present invention that the first brake lining segment surrounds the second brake lining segment at least partially, in particular completely. For example, the first brake lining segment borders the second brake lining segment. It is conceivable here that the second brake lining segment is set back in comparison with the first brake lining segment, and correspondingly more force effort is necessary for an operative connection between the second brake lining segment and the abutment, in particular a brake disk or a brake drum. As a result, it can be ensured, for example, that the second brake lining segment contributes to the friction profile only in the case of an intensive brake operation, that is to say above a fixed threshold value. A second brake lining segment which is set back in comparison with the first brake lining segment can be realized, for example, by way of corresponding dimensioning of the thickness of the first brake lining segment and the second brake lining segment. It is also conceivable that the carrier element has a recessed profile, and the second brake lining segment is mounted in the recessed region of the carrier element.

It is preferably provided that the second brake lining segment is configured from a material with a higher coefficient of friction than the first brake lining segment. If, for example, the second brake lining segment is preferably used in the case of emergency braking operations, that is to say a braking operation with a brake intensity above the threshold value, it is advantageous that the brake shoe generates a maximum brake force in the case of said braking operations. For this reason, the second brake lining segment is advantageously configured from a material with a higher coefficient of friction than the first brake lining segment. The wear of a material with a higher coefficient of friction is usually greater than the wear of a material with a lower coefficient of friction, it being preferred for this reason to configure the first brake lining segment with a material with a lower coefficient of friction, and therefore also low wear, than that of the second brake lining segment.

It is provided, in particular, that the coefficient of friction of the second brake lining segment is from 1.1 to 3 times, preferably from 2 to 3 times, and particularly preferably from 1.3 to 1.7 times the coefficient of friction of the first brake lining segment. Depending on the use profile which is expected for the lining carrier during operation in the motor vehicle, it can be preferred to configure the second brake lining segment from a material with a considerably higher or merely slightly higher coefficient of friction. Thus, for example, the material of the second brake lining segment can have three times the coefficient of friction of the material of the first brake lining segment, in order, in the case of an emergency braking operation, to achieve a considerably increased overall coefficient of friction, or mean coefficient of friction of the entire brake shoe or the entire lining unit. In cases of this type, the coefficient of friction of the second brake lining segment assumes, for example, a value of between 2 to 3 times the coefficient of friction of the first brake lining segment. Secondly, it can also be preferred that the second brake lining segment is configured from a material of a merely slightly higher coefficient of friction than the first brake lining segment if, for example, relatively frequent emergency braking operations relative to the partial braking operations are to be expected. In cases of this type, the coefficient of friction of the second brake lining segment assumes, for example, a value of between 1.3 to 1.7 times the coefficient of friction of the first brake lining segment.

It is expediently provided that the carrier element has a first carrier element segment and a second carrier element segment, it being possible for the first brake element segment to be mounted on the first carrier element segment and for the second brake element segment to be mounted on the second carrier element segment. As a result, the first brake lining segment and the second brake lining segment can be moved independently of one another, and a temporal change in the spatial friction profile can accordingly be realized. In particular, it can be controlled in a requirement-dependent manner when and to what extent in each case the first brake lining segment and the second brake lining segment come into an operative connection with the abutment. It is preferably provided that the first brake lining segment and the second brake lining segment are dimensioned and configured in each case in such a way that the first brake lining segment is mounted on the first carrier element segment and the second brake lining segment is mounted on the second carrier element segment, without projecting, in particular in a direction which runs parallel or perpendicularly with respect to the friction direction.

It is provided in accordance with a further embodiment of the present invention that the first carrier element segment and the second carrier element segment are decoupled from one another. As a result of the decoupling, the first carrier element segment and the second carrier element segment and therefore the first brake lining segment and the second brake lining segment can be set individually in a manner which is dependent on the load situation. In particular, it can be controlled in a manner which is dependent on a brake intensity whether the first brake lining segment and the second brake lining segment or only the first or the second brake lining segment are/is brought into an operative connection with the abutment.

It is provided in one advantageous embodiment of the present invention that the first carrier element segment and/or the second carrier element segment can be loaded with a force, in particular by means of a force which emanates from a spring element and acts in the direction of the abutment (that is to say, the brake disk or the brake drum). As a result, for example, a setting can be made as to how much force has to be applied before the first brake lining segment and the second brake lining segment come into operative connection with the abutment. To this end, the first carrier element segment and the second carrier element segment can be loaded in each case individually with a force, or it is provided that the first carrier element has a first spring element and the second carrier element segment has a second spring element, the first spring element and the second spring element differing with regard to their restoring force. As a result, during pressing of the first and the second brake lining segment, different restoring forces act on the respective brake lining segments, as a result of which different coefficients of friction are set for the first brake lining segment and the second brake lining segment. The ratio of the restoring force of the first spring element is preferably greater by a factor of between 1.2 and 8 times, preferably of between 2 and 6 times, and particularly preferably of between 3.5 and 5.5 times than the restoring force of the second spring element. As a result, the restoring force of the first spring element on the first carrier element segment does not have to be counteracted before the second spring element of the first carrier element segment comes into effective contact with the abutment.

Furthermore, it is preferably provided that a ratio of the friction area of the first brake lining segment to the friction area of the second brake lining segment assumes a value of between 1 and 7.5, preferably of between 1 and 4.3, and particularly preferably of between 1 and 2.2. As a result, the size of the second brake lining segment can advantageously be set to the respective requirement which is dependent on the use case.

It is provided in a further advantageous embodiment of the present invention that the first brake lining segment and/or the second brake lining segment have/has a circular, a polygonal, triangular and/or an elliptical cross section in a plane which runs parallel to the carrier element.

It is preferably provided that the shape and/or material composition of the first brake lining segment and/or the second brake lining segment are/is dependent on the temperature development to be expected during operation or the friction speed in the use range. As a result, phenomena which occur during operation of the brake apparatus are advantageously taken into consideration in the design of the first brake lining segment and the second brake lining segment.

A further subject matter of the present invention is a system for the modular assembly of a brake shoe comprising a carrier element, a first brake lining segment and a second brake lining segment for mounting on the carrier element. All of the features described for the brake shoe according to the invention and their advantages can likewise be transferred analogously to the system according to the invention, and vice versa.

In addition, the object is achieved by way of a brake apparatus, in particular a drum brake or a disk brake, having a brake shoe according to the invention. All of the features described for the brake shoe according to the invention and their advantages can likewise be transferred analogously to the brake apparatus according to the invention, and vice versa.

A further subject matter of the present invention is a method for producing a brake shoe, in particular as claimed in one of the preceding claims, comprising: providing of a carrier element, a first brake lining segment, and a second brake lining segment which can differ from the first brake lining segment with regard to shape and/or material composition, and fixing of the first brake lining segment and the second brake lining segment on the carrier element, the first brake lining segment being arranged spaced apart from the second brake lining segment. All of the features described for the brake shoe according to the invention and their advantages can likewise be transferred analogously to the method according to the invention, and vice versa. The first brake lining segment and the second brake lining segment are preferably fastened to the carrier element in such a way that they differ from one another in terms of their force loading.

BRIEF DESCRIPTION OF THE DRAWINGS

Further advantages and features result from the following description of preferred embodiments of the subject matter according to the invention with reference to the appended figures. Individual features of the individual embodiment can be combined with one another here within the context of the invention.

In the figures.

DETAILED DESCRIPTION OF THE PREFERRED EMBODIMENTS

Figure 1:
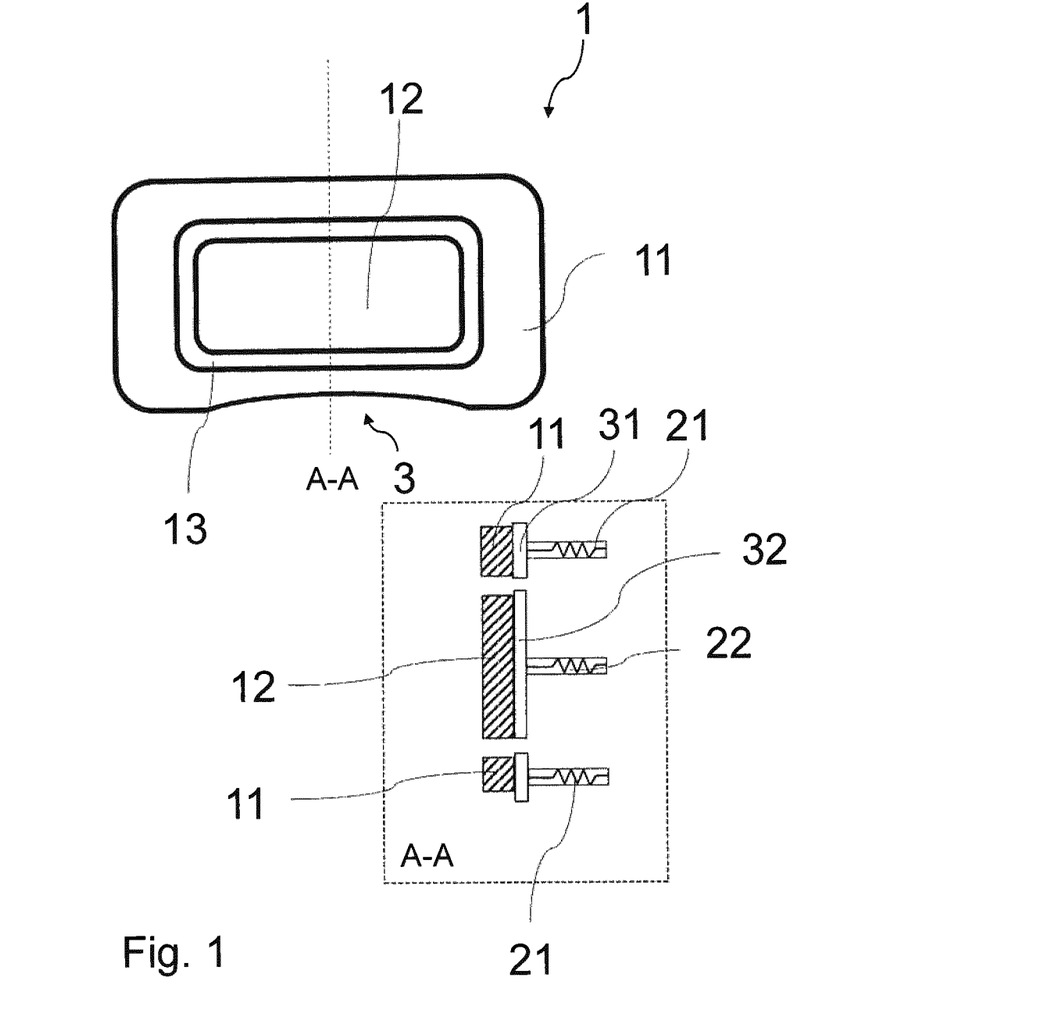
FIG. 1 shows a brake shoe in a first preferred embodiment of the present invention, in a plan view and in a sectional view.

FIG. 1 shows a brake shoe 1 in a first preferred embodiment of the present invention, in a plan view and in a sectional view along a plotted A-A sectional line. This is, in particular, a brake shoe 1 which is provided for a brake apparatus, such as a disk brake or drum brake. Brake apparatuses of this type are installed, for example, on wheels of commercial vehicles, which wheels rotate about a wheel axle, in order to counteract the rotation of the wheel in a braking state as required. To this end, in the braking state, a brake lining on the brake shoe comes into an operative connection with an abutment, for example a disk wall or brake drum wall, which is connected fixedly to the wheel so as to rotate with it. For the adaptation which is as optimum as possible of the friction profile to the respective brake apparatus, in particular to its field of use, it is provided that the brake shoe 1 has a first brake element segment 11 and a second brake lining segment 12 which is spaced apart from the first brake lining segment 11 in the mounted state. It is provided, in particular, that the first brake lining segment 11 and the second brake lining segment 12 differ, preferably in a manner which is dependent on the brake apparatus and/or the field of use of the brake apparatus. In the embodiment which is shown, a frame-shaped first brake lining segment 11 is provided, in the bordered region of which a second rectangular brake lining segment 12 is arranged.

For the further adaptation of the friction profile along the brake shoe 1, it is provided that the first brake lining segment 11 is arranged on a first carrier element segment 31 and the second brake lining segment 12 is arranged on a second carrier element segment 32. Here, the first carrier element segment 31 is preferably adapted to the shape of the first brake lining segment 11 and/or the second carrier element segment 32 is adapted to the shape of the second brake lining segment 12. Here, the first carrier element segment 31 and the second carrier element segment 32 are decoupled from one another and are configured in such a way that they can be offset or displaced in each case independently of one another. The first carrier element segment 31 and the second carrier element segment 32 can preferably be loaded with forces of different magnitude independently of one another, with the result that in each case different frictional resistances are brought about via the different forces during the braking by the first brake lining segment 11 and the second brake lining segment 12. A control apparatus is preferably provided which is configured in such a way that the first carrier element segment 31 and the second carrier element segment 32 are loaded in each case with a predetermined force in a manner which is dependent on the type of the actuation of the brake apparatus. In other words: the ratio between a first force which acts on the first carrier element segment 31 and a second force which acts on the second carrier element segment 32 changes in a manner which is dependent on a brake intensity. It is conceivable here that, for example, the correlation of forces reverses if a threshold value for the brake intensity is exceeded. It is also conceivable that the first carrier element segment 31 remains inactive below a further threshold value for the brake intensity and the second carrier element segment 31 is loaded with a second force, whereas the first carrier element segment 31 is loaded with a first force in addition to the second carrier element segment 21 above the further threshold value. Furthermore, it is preferably provided that the first carrier element segment 31 is prestressed or loaded by way of a first spring element 21 and the second carrier element segment 31 is prestressed or loaded with a second spring element 22, with the result that different forces act in each case on the first carrier element segment 31 and the second carrier element segment 32 when the first brake lining segment 11 and the second brake lining segment 12 come into an operative connection with the abutment, for example a disk or a brake drum, during braking.

Furthermore, it is provided in the exemplary embodiment of FIG. 1 that the first brake lining segment 11 and the first carrier element segment 31 have a curvature 3 on one side, the curvature 3 preferably being matched with a shape of the abutment, with which the first brake lining segment 11 comes into an operative connection during braking.

Figure 2:
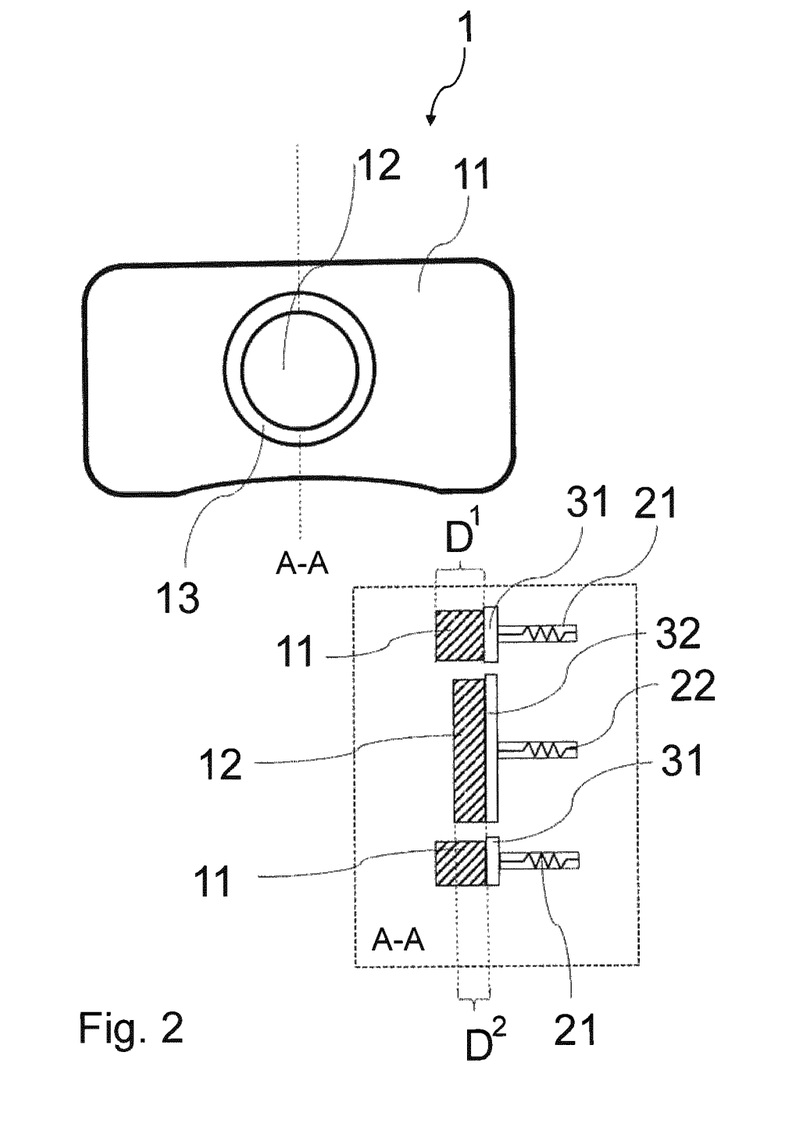
FIG. 2 shows a brake shoe in a second preferred embodiment of the present invention, in a plan view and in a sectional view.

FIG. 2 shows a brake shoe 1 in a second preferred embodiment of the present invention, in a plan view and in a sectional view along a plotted A-A sectional line. Here, the brake shoe 1 coincides substantially with that one from FIG. 1, and differs merely by way of the shape of the first brake lining segment 11 and the second brake lining segment 12 and in terms of the ratio of the thickness $D^1$ of the first brake lining segment 11 to the thickness $D^2$ of the second brake lining segment 12. In particular, the first brake lining segment 11 comprises a circular cutout in the center, within which cutout the second brake lining segment 12 which is likewise of circular configuration is arranged. Furthermore, it is provided that a thickness $D^1$ of the first brake lining segment 11, which thickness $D^1$ is measured in a direction which runs along perpendicularly with respect to the main extent of the carrier element, is thicker than the thickness $D^2$ of the second brake lining segment 12. In particular, the first brake lining segment is from 1.8 to 2.3 times, particularly from 1.5 to 2 times, and particularly preferably from 1.3 to 1.7 times thicker than the second brake lining segment 12. As a result of the first brake lining segment 11 of thicker configuration, the second brake lining segment 12 has to cover a greater distance, in order to come into contact with the abutment. To this end, a greater force effort in comparison with the first brake lining segment 11 is preferably necessary, which force effort is applied, for example, only in the case of an intensive actuation, for example in the case of a comparatively hard braking operation. As a result, in the embodiment which is shown, for example, the second brake lining segment 12 can be used only in exceptional situations, the wear of said second brake lining segment 12 being reduced in an advantageous way.

Figure 3:
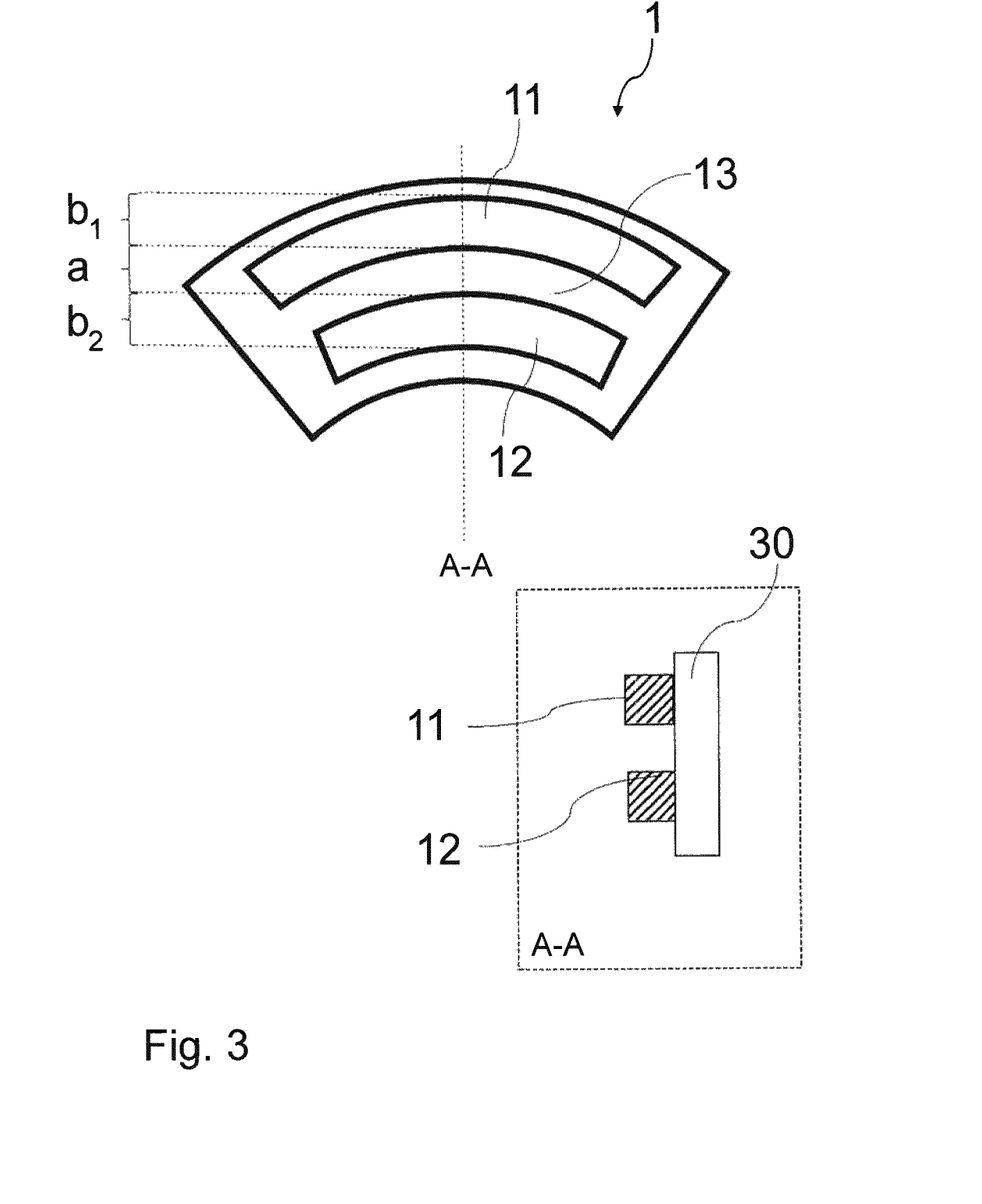
FIG. 3 shows a brake shoe in a third preferred embodiment of the present invention, in a plan view and in a sectional view.

FIG. 3 shows a brake shoe 1 in a third preferred embodiment of the present invention, in a plan view and in a sectional view. It is provided here that the first brake lining segment 11 and the second brake lining segment 12 are arranged on a common carrier element 30. In particular, the first brake lining segment 11 and the second brake lining segment 12 are configured as part-annular strips which are arranged above one another in the radial direction in the installed state. The first brake lining segment 11 and the second brake lining segment 12 are preferably separated by way of a gap 13. It is provided, in particular, that a spacing (measured in one direction) between the first brake lining segment and the second brake lining segment assumes a value of between 0.1 and 0.4 times, preferably of between 0.08 and 0.25 times, and particularly preferably of between 0.05 and 0.13 times an extent $b_1$, $b_2$ (measured in the same direction) of the first brake lining segment 11 and the second brake lining segment 12, that is to say a sum of a width $b_1$ of the first brake lining segment 11 and a width $b_2$ of the second brake lining segment 12. The spacing a is preferably measured in the radial direction in the installed state of the brake apparatus.

In the exemplary embodiment which is shown in FIG. 3, the first part-annular brake lining segment 11 and the second part-annular brake lining segment 12 come into contact circumferentially with the abutment during braking; the first brake lining segment 11 is to be assigned a first radius and the second brake lining segment 12 is to be assigned a second radius. Since the first radius is greater than the second radius, different friction speeds occur for the first brake lining segment 11 and the second brake lining segment 12. The temperature behavior and a level of the coefficient of friction of the first brake lining segment 11 and the second brake lining segment 12 are accordingly different, which in turn influences the braking performance of the overall brake shoe 1 during operation. By way of a material composition for the first brake lining segment 11 and the second brake lining segment 12, in particular in a manner which is dependent on the friction speed difference and/or temperature behavior difference to be expected between the region for the first brake lining segment 11 and the second brake lining segment 12, it is advantageously possible to optimize the overall friction profile of the brake shoe 1. It is preferably provided that the first brake lining segment 11 is designed for comparatively high friction speeds and the second brake lining segment 12 is designed to be comparatively temperature-resistant.

Figure 4A:
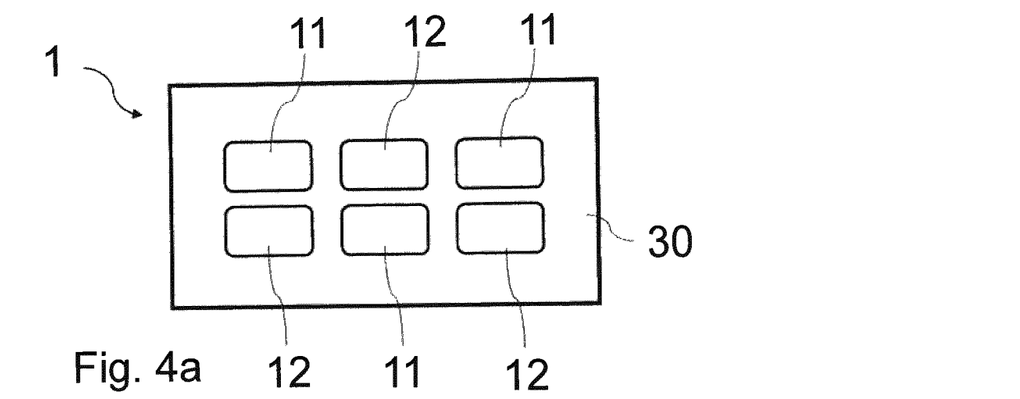
FIGS. 4a-4c show a brake shoe in a fourth, fifth and sixth preferred embodiment of the present invention, in a plan view.
Figure 4B:
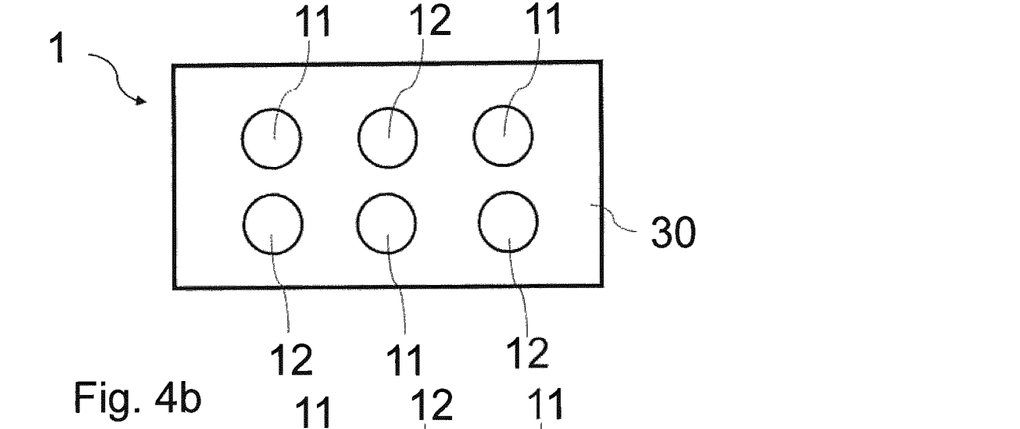
Figure 4C:
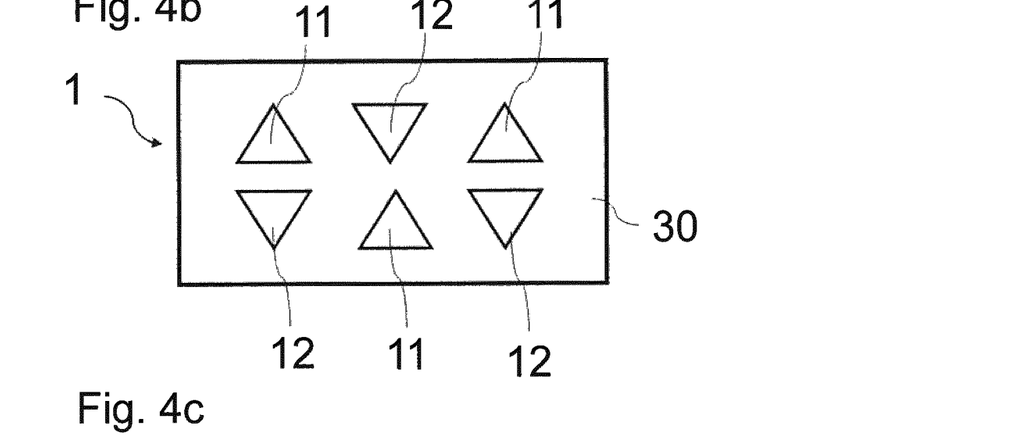

FIGS. 4a to 4c show brake shoes 1 in a fourth, fifth and sixth preferred embodiment of the present invention, in plan view. It is provided here, in particular, that the first brake lining segment 11 and the second brake lining segment 12 are arranged in a pattern, in particular a pattern with rows and columns, for example in a matrix or chessboard-like pattern. Here, the first brake lining segment 11 and the second brake lining segment 12 are of rectangular configuration in FIG. 4a, circular configuration in FIG. 4b and triangular configuration in FIG. 4c, the triangles which are shown in FIG. 4c changing their orientation along the row, in which they are arranged.

It is provided, in particular, that a ratio of first brake lining segments 11 and second brake lining segments 12 in a row which faces away from the wheel axle is reversed with respect to the ratio of first brake lining segments 11 and second brake lining segments 12 of a row which faces the wheel axle. As a result, the number of first brake lining segments 11 and second brake lining segments 12 can be adapted in a manner which corresponds to the loading to be expected. The ratio of a first brake lining segment 11 and a second brake lining segment 12 in the row which faces away from the wheel axle in addition to that in the row which faces the wheel axle is preferably 1:2, 1:3 or 2:3, or vice versa.

LIST OF DESIGNATIONS

1 Brake shoe
11 First brake lining segment
12 Second brake lining segment
13 Gap
21 First spring element
22 Second spring element
30 Carrier element
31 First carrier element segment
32 Second carrier element segment
a Spacing
$b_1$ Width of the first brake lining segment
$b_2$ Width of the second brake lining segment
$D^1$ First thickness
$D^2$ Second thickness

The invention claimed is:

1. A brake shoe having brake linings for a disk brake, comprising:
    a carrier element;
    a first brake lining segment configured to be mounted on the carrier element and having a first outer surface facing away from the carrier element; and
    a second brake lining segment configured to be mounted on the carrier element and having a second outer surface facing away from the carrier element;
    the first brake lining segment and the second brake lining segment differing from one another with regard to at least one of material composition, force loading and/or shape to define a friction profile, the first brake lining segment and the second brake lining segment being configured to be reversibly exchanged with one another such that the first and second outer surfaces face away from the carrier element, and a coefficient of friction of the second brake lining segment being from 2 to 3 times a coefficient of friction of the first brake lining segment.

2. The brake shoe as claimed in claim 1, the first brake lining segment and the second brake lining segment being spaced apart from one another in a mounted state.

3. The brake shoe as claimed in claim 1, configured such that, in an installed state of a brake apparatus in which state the brake apparatus is installed with the brake shoe on a wheel with a wheel axle, the first brake lining segment is spaced apart from the second brake lining segment in a radial direction and/or circulating direction in relation to the wheel axle.

4. The brake shoe as claimed in claim 1, a spacing which is measured in one direction between the first brake lining segment and the second brake lining segment is between 0.1 and 0.4 times an extent of the first brake lining segment and the second brake lining segment where the extent is measured in a same direction as the one direction.

5. The brake shoe as claimed in claim 4, wherein the spacing between the first and second linings is between 0.08 and 0.25 times the extent.

6. The brake shoe as claimed in claim 5, wherein the spacing between the first and second linings is between 0.05 and 0.13 times the extent.

7. The brake shoe as claimed in claim 1, wherein the first brake lining segment at least partially surrounds the second brake lining segment.

8. The brake shoe as claimed in claim 7, wherein the first brake lining segment completely surrounds the second brake lining segment.

9. The brake shoe as claimed in claim 1, the first brake lining segment comprising a material with a higher coefficient of friction than the second brake lining segment.

10. The brake shoe as claimed in claim 1, the carrier element having a first carrier element segment and a second carrier element segment, the first brake element segment configured to be mounted on the first carrier element segment and the second brake element segment configured to be mounted on the second carrier element segment.

11. The brake shoe as claimed in claim 10, the first carrier element segment and/or the second carrier element segment is configured to be loaded with a force from a spring element.

12. The brake shoe as claimed in claim 1, wherein a ratio of a friction area of the first brake lining segment to a friction area of the second brake lining segment is between 1 and 7.5.

13. The brake shoe of claim 12, wherein the ratio is between 1 and 4.3.

14. The brake shoe of claim 13, wherein the ratio is between 1 and 2.2.

15. The brake shoe as claimed in claim 1, wherein a contribution of the first brake lining segment and a contribution of the second brake lining segment to the friction profile are load-dependent.

16. The brake shoe as claimed in claim 1, further comprising:
a third brake lining segment arranged as a reserve or replacement brake lining segment on the carrier element.

17. A brake apparatus having a brake shoe as claimed in claim 1.

18. A system for the modular assembly of a brake shoe comprising:
a carrier element;
a first brake lining segment and having a first surface facing away from the carrier element; and
a second brake lining segment configured to mount on the carrier element and having a second surface facing away from the carrier element, the first brake lining segment and the second brake lining segment each being configured to be reversibly exchanged with one another such that the first and second surfaces face away from the carrier element, wherein a coefficient of friction of the second brake lining segment is from 2 to 3 times a coefficient of friction of the first brake lining segment.

19. A method for producing a brake shoe, comprising:
providing a carrier element;
providing a first brake lining segment and having a first surface facing away from the carrier element; and
providing a second brake lining segment differing from the first brake lining segment with regard to at least one of shape and material composition and having a second surface facing away from the carrier element; and
fixing the first brake lining segment and the second brake lining segment on the carrier element to configure a friction profile, the first brake lining segment being arranged spaced apart from the second brake lining segment, the first brake lining segment and the second brake lining segment configured to be exchanged reversibly, wherein a coefficient of friction of the second brake lining segment being from 2 to 3 times a coefficient of friction of the first brake lining segment the first and second line brake segments configured to be reversibly exchanged with one another such that the first and second surfaces face away from the carrier element.

* * * * *